Patented May 15, 1923.

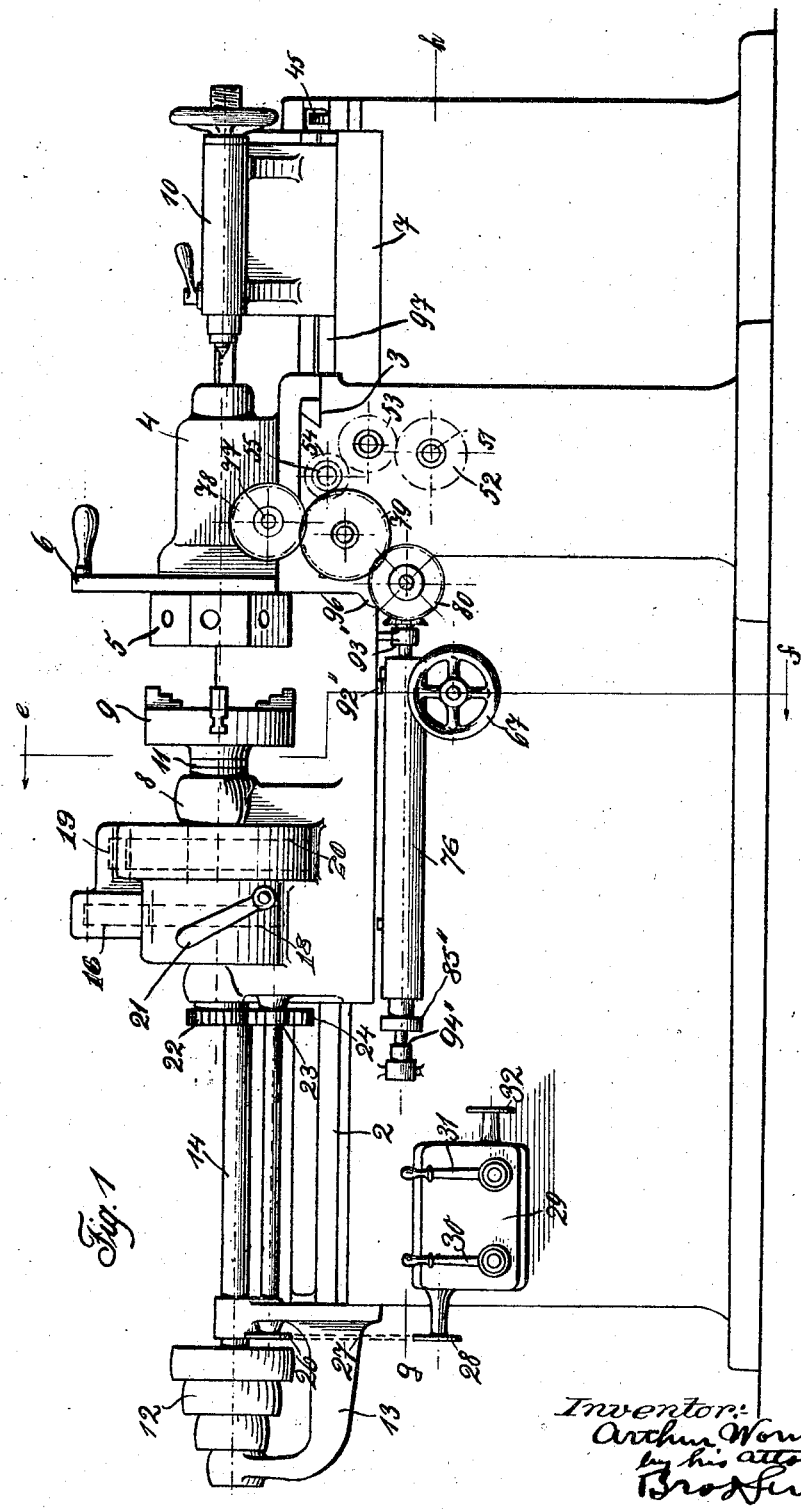

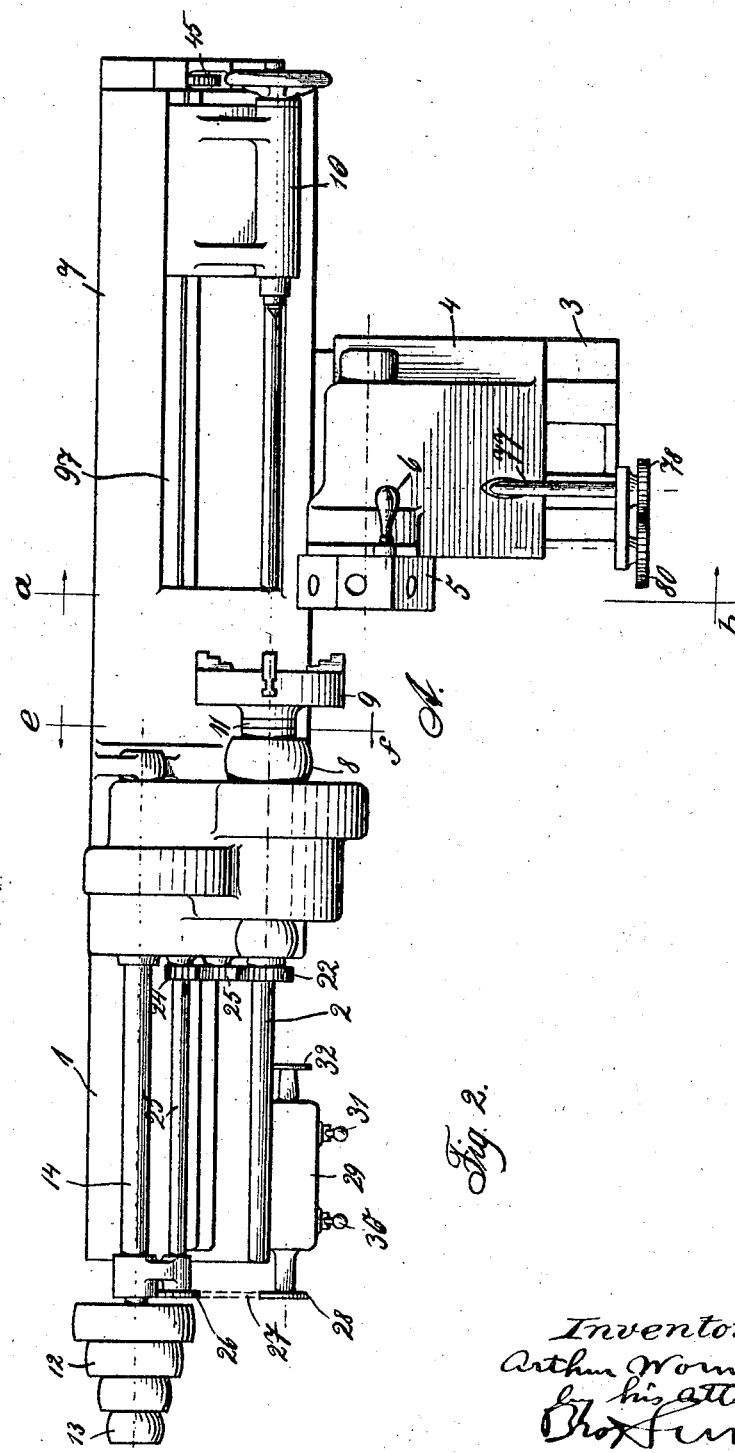

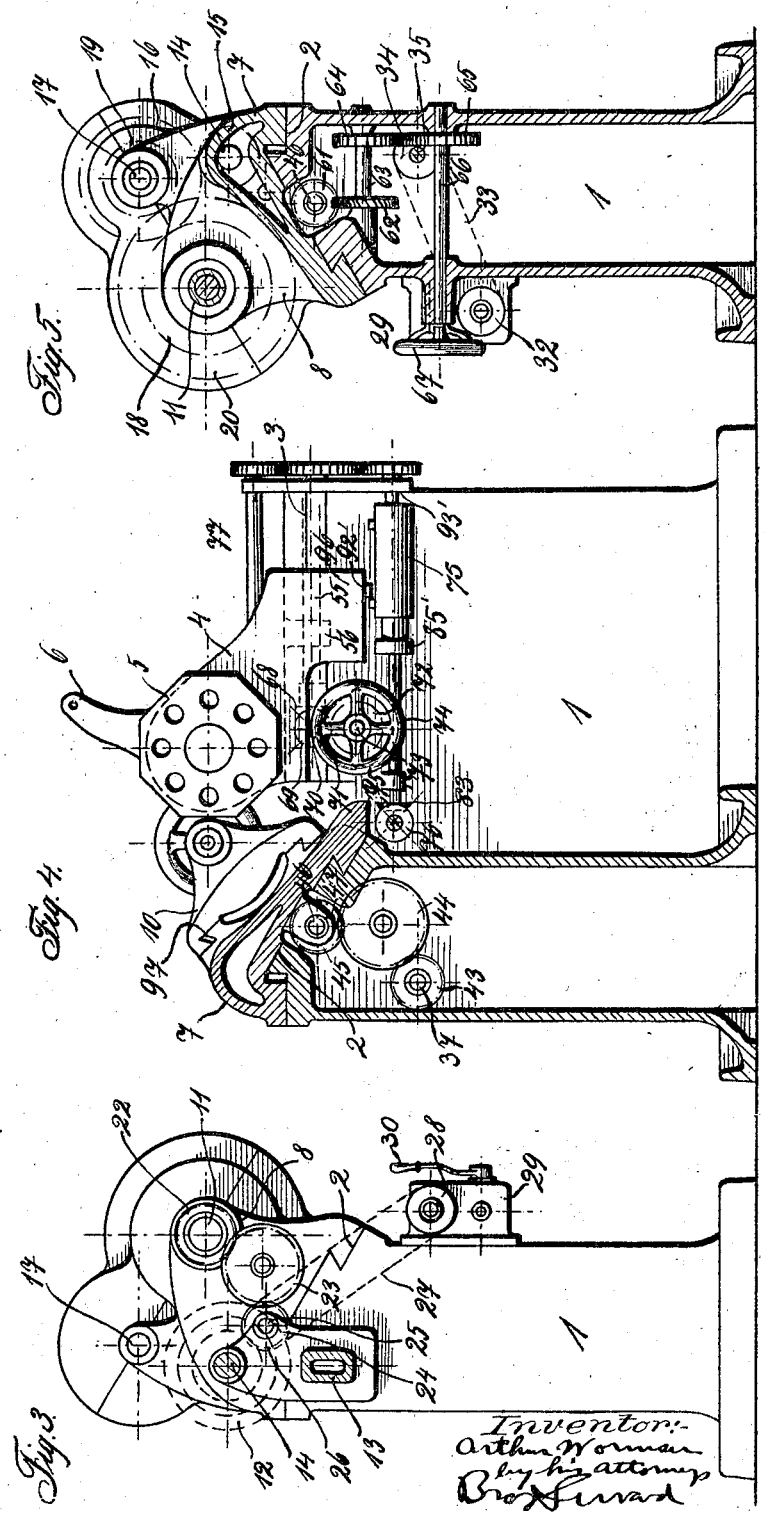

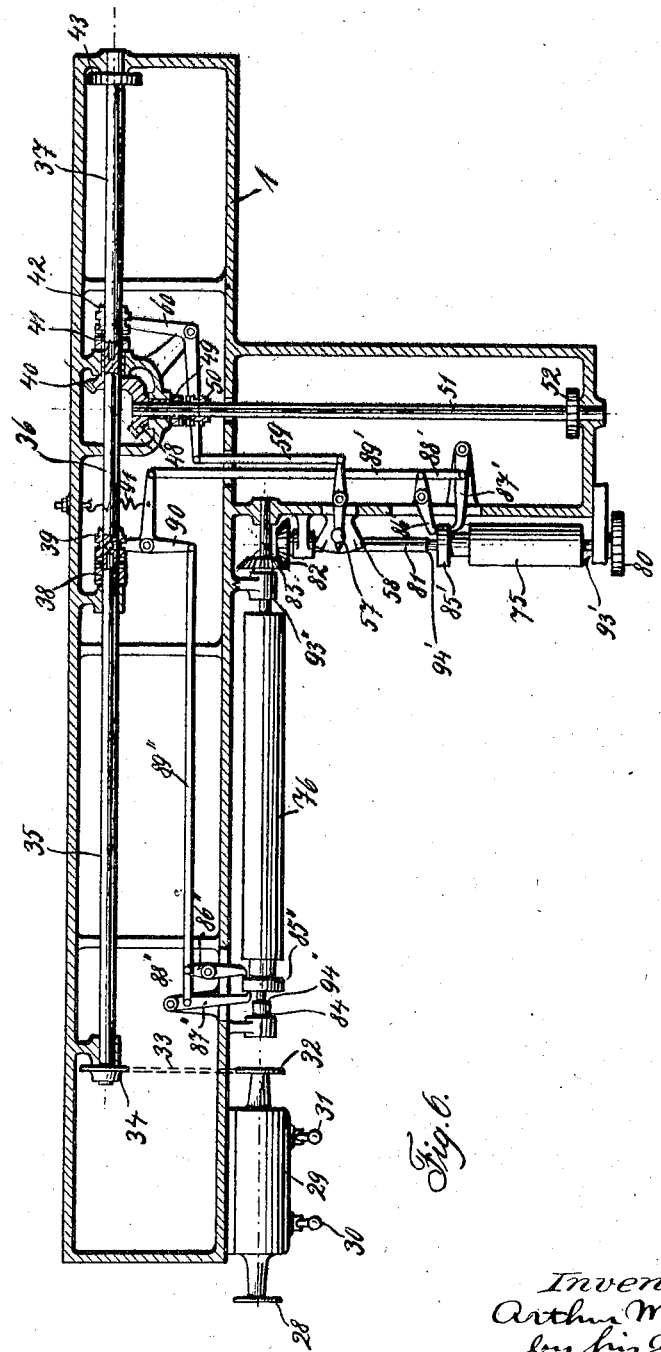

1,455,558

UNITED STATES PATENT OFFICE.

ARTHUR WORMSER, OF OFFENBACH-ON-THE-MAIN, GERMANY.

LATHE.

Application filed May 10, 1916. Serial No. 96,726.

*To all whom it may concern:*

Be it known that I, ARTHUR WORMSER, a subject of the German Empire, and resident of Offenbach-on-the-Main, Germany, have invented a new and useful Improvement in Lathes (for which I have filed an application in Germany, application of May 11th, 1915), of which the following is a specification.

The ideal structure of a lathe would be that which allows for a practically unlimited enlargement both of the piece of work relating to length and diameter and of the longitudinal and transverse motions of the tool relative to the piece of work without injuring the stability both of the piece of work and of the tool.

One difficulty encountered when pursuing this ideal is to avoid the interference between the support of the tool and the tail stock.

This difficulty is so grave with automatic screw machines that no such machine exists as far as I know, in which any tail stock is used. The tools occupying just that place in the face of the work to be turned where in the normal lathe the tail stock is disposed of, it is impossible to turn automatically pieces of such length as are workable only between centers. It was attempted by several inventors to widen the longitudinal motion of the slide rest, and different feed mechanisms with or without cams are found, by which this object was to be attained; but none of these arrangements were effective to alter the existing screw machines so that they were able to turn shafts, spindles and other parts which are longer than they are thick. The stability both of the piece of work and of the tool diminishes so rapidly with increasing length of the piece to be turned that practically the lengthened motion of the slide rest is of no value.

The same applies to turret lathes in their normal shape.

Even with the normal lathe that difficulty is felt in several cases. Especially when thin pieces of work are to be turned at the end near the tail stock, the back center must be screwed out too far if interference between the tool rest and the tail stock is to be prevented.

Another difficulty lies in the turning of pieces of a somewhat larger diameter. This difficulty like the first mentioned is felt more with automatic screw machines and turret lathes than with the normal lathe.

In automatic screw machines the arrangement of the slide rest and of the tools in the face of the spindle and their motion exclusively in a longitudinal direction forces the use of unstable and expensive tool holders if large pieces are to be turned on their cylindrical surface, and even with these tools it is possible to turn but a narrow strip according to the breadth of the cutting tool. A complete face of large diameter cannot be worked on any existing automatic screw machine by the tools in the turret. The cross slide is a makeshift of questionable worth; for in one instance it admits no more than two tools and accordingly is not adapted to compensate for the lacking cross motion of the many tools in the turret slide; in the other instance it prevents the total center height coming in force.

The object of my invention is a disposal appropriate to overcome the said difficulties and others not mentioned above. It is to be used with all kinds of lathes, be they automatic or not, using a turret or simple tool rest, &c., but the advantages resulting from its application are proportionate to the difficulties encountered greatest with automatic turret lathes and least with simple lathes.

Describing the devices invented by me in general terms, they consist in providing a special slide carrying the head and tail stocks. This slide undergoes one of the longitudinal and cross motions while the tool slide moves only transversely if said slide supporting the piece of work is fed longitudinally, and longitudinally if said slide carries out the cross motion.

The said work piece carrying slide being an oblong part, it will as a rule be convenient to follow the first alternative, but the second is opportune for very long pieces of work as otherwise the bed becomes somewhat unhandy. The feed mechanisms will be double or multiplied in this case to secure a parallel motion of the slide; but this being to a certain degree a special application of the principle to be claimed by me, I will discuss in the following the alternative of the tool slide moving transversely and the work carrying slide longitudinally.

Beginning by the description of a self-feeding turret lathe as an instance, I refer to the drawings filed herewith.

Fig. 1 is a front elevation of the machine,
Fig. 2 a plan,
Fig. 3 a side elevation with the bracket supporting the drive shaft broken away and the pulleys shown in dotted outline,
Fig. 4 is a vertical section taken in the plane of the line $a$—$b$ of Fig. 2,
Fig. 5 a vertical section taken in the plane of the line $e$—$f$ of Figs. 1 and 2, and
Fig. 6 a horizontal section taken in the plane of the line $g$—$h$ of Fig. 1.

The T-shaped bed 1, stiffened by webs as usual, carries two horizontal guide ways 2, 3, normal to each other. On the guide way 3 slides the cross slide 4 with the turret 5 indexed by the hand lever 6 around a horizontal axis parallel to the axis of the spindle. The guide way 2 carries the longitudinal slide 7 containing the head stock 8 with the chuck 9 and the tail stock 10. If cylindrical surfaces are to be turned, the cross slide 4 stands still and the slide 7 alone moves. If on the contrary faces are to be machined or pieces cut off the slide 7 rests and the cross slide 4 is fed transversely.

The motion of the spindle 11 is derived from an overhead countershaft (not shown) by the stepped cone 12 (supported by the arm 13), shaft 14 and gears 15, 16, countershaft 17 and gears 18—20. Gear 15 is allowed to shift on the splined shaft 14 when the slide 7 moves, and is forced to rotate simultaneously with it whenever the slide is standing. The countershaft 17 rotates as long as the pulley is running. But the gears 18 engaging with 16 and 20 engaging with 19 on the countershaft are running loose on the spindle as long as the handle 21 is in its middle position. They are alternately connected with the spindle by clutches (not shown) if the handle 21 is thrown to the right or to the left, so that every step of the cone produces two different speeds of the spindle as is usual with this kind of machines.

The spindle 11 carries a chuck 9 but the latter may be replaced by a live center or a spring collet and stock feeding mechanism as will be understood.

The longitudinal feed as well as the cross feed are derived from the spindle 11 by gear 22 fast thereon, meshing with gears 23, 24, which gear 24 is splined on shaft 25, chain wheel 26, chain 27 and corresponding chain wheel 28. This chain wheel 28 is keyed to the upper shaft of a gear case 29 by which the rate of feed and its direction may be altered according to the positions of hand levers 30, 31. Another chain drive 32, 33, 34, moves the first of three shafts 35, 36, 37, alined horizontally in the bed but sticking loose one in the other. There are clutches 38, 39 and 41, 42 provided to connect the three shafts as required if the longitudinal feed screw 46 is to be rotated by the intermediate gears 43—45 and the slide 7 thus fed by means of the nut 47. If one needs cross feed clutch 41, 42, is disconnected and clutch 49, 50 engaged. Clutch 38, 39, being still thrown in, shaft 36 is rotating and with it the bevel gear 40 keyed to it. This engages with another bevel gear 48 loose on shaft 51 but connected to it by clutch 49, 50. Thus motion is transmitted by gears 52, 53, 54, to the cross feed screw 55 which moves the cross slide by nut 56.

Clutches 41, 42 and 49, 50 are alternately engaged by a leverage consisting of hand lever 57 moved over a segment 58, connecting rod 59 and bell crank lever 60 which shifts the loose parts of the clutches 42 and 50. If lever 57 is in its mean position, both feed screws are free to be rotated by hand, which is done by the following devices. On the left hand end of the longitudinal feed screw 46 is fixed a helicoidal wheel 61 which engages a corresponding wheel 62 on shaft 63. This is connected to shaft 66 and pilot wheel 67 keyed on it by spur wheels 64 and 65. Turning the hand wheel 67 thus produces shifting of the longitudinal slide. In a similar way the cross feed screw 55 is turned by the hand wheel 74 through bevel gears 68, 69, shaft 70, spur wheels 71, 72 and shaft 73. Thus the two hand wheels 67 and 74 as well as the hand levers 6 and 57 mentioned above are well within the reach of a workman attending to the machine from a place marked A in Fig. 2.

Stop drums 75, 76, are provided for the longitudinal and transverse motions respectively containing a forward and a back stop each for every tool in the turret. The drums are turned one revolution at every indexing of the turret by the splined shaft 77, gears 78, 79, 80, shaft 81 carrying the cross stops, mitre wheels 82, 83, and shaft 84 carrying the longitudinal stops. Each of the drums 75, 76, has a ring 85′, 85″ fixed to its end on which bear the tips of two levers 86′, 86″ and 87′, 87″. One of these (86′, 86″) is double-armed, the other (87′, 87″) one-armed. They are connected by a short rod 88′, 88″, so that they act like a pair of tongs and hold the drums in a definite position if rod 89′, 89″ pulls at the rear end of the double-armed lever 86′, 86″. Rods 89′, 89″ are pivoted to a three-armed lever 90 which is influenced by a spring 91 so that it tends always to throw the clutch 38, 39, in and to close the tongs by means of the rods 89′, 89″. If one of the drums 75, 76, is shifted in either direction by one of the moving stops 92′, 92″ touching the stops on the drum, the lever 90 is turned against the tension of the spring and clutch 38, 39 opened. Thus either feed is interrupted and the workman can move the slides by hand until the drums are pressed to the faces 93', 94', 93", 94" at the shafts 81, 84 respectively. The drums are protected against chips and the cooling liquids by the overhanging portions 95, 96.

The guide way 2 for the longitudinal motion is well guarded against chips and cooling liquid. The bearing surface is much larger and longer and the wear proportionately lessened. The section adopted for the said guide way is best fit to counteract both the weight of the slide and the momentum of the cutting resistance. The tail stock is of the strongest form; it does not overhang and has a broad base so that it is stiff in either direction. The tool support has a very stable shape and no interference between the tail stock and the tool rest occurs in any position, though both of them are so formed that one would do it if only one of them were to be used. The support of the cross slide on the bed is better than in any normal lathe and would not be worse if the diameter to be turned were multiplied.

Besides the said advantages, the following are to be mentioned. In spite of the forwardly moving tail stock the turret is longer and consequently better supported than in most of the other types of lathes. The tail stock permits turning any length, and in view thereof live or steady rests can be added. The cross motion permits big faces to be machined, cutting off without a special cross slide, backing off internal threads without special tool holders, etc. For long and short pieces of work and for small and large diameters the tool holders are alike simple, stable and easily prepared. If the nuts 47 and 56 are so arranged that they can be opened it is a convenient thing to provide for copying. A templet will then be fixed to the slide 7 and a finger to cross slide 4. According to the angles of the section either the cross motion or the longitudinal feed is engaged and the other nut opened.

The vast field opened to the turret lathe by the new principle is in no respect narrowed if it is constructed so as to act automatically, but an important advantage is added. Till now an automatic lathe possessing a universal motion of the tools in the turret relative to the piece of work has never been built, as it is hopeless to dispose all the cams, levers, &c., in the compound slide rest. But it is easy to arrange all that is required for the motion of the slide 7 in the long part of the bed and what is needed for the cross motion, indexing, &c., of the turret in the cross part of the bed.

As is natural with a device that can be applied to so many different forms of machines, I did not even attempt to describe or to mention every possible application of it, but

What I claim is:

1. In a lathe, the combination of a bed having guide ways disposed at right angles to each other, a work carrying slide provided with head and tail stocks movable as a unit on one guide way, a tool carrying slide movable on the other guide way, said work carrying slide and tool carrying slide being so arranged that the axes of the immediate supports for work and tool are substantially directly above a supporting edge of the respective guide ways, and means for independently moving the slides on their guides.

2. In a lathe, the combination of a bed having guide ways disposed at right angles to each other, one of said guide ways being horizontally inclined, a work carrying slide provided with head and tail stocks movable as a unit on said inclined guide way, said tail stock being adjustably mounted on said slide, a tool carrying slide movable on the other guide way, and means for independently moving the slides on their guides.

3. In a lathe, the combination of a bed having guide ways, one of said guide ways being horizontally inclined and the other horizontally disposed at right angles to said inclined guide way, a work carrying slide provided with head and tail stocks movable as a unit on the inclined guide way, said tail stock being adjustably mounted on said slide, a tool carrying slide movable on the horizontally disposed guide way, and means for independently moving the slides on their guides.

ARTHUR WORMSER.